United States Patent [19]
Dunn et al.

[11] Patent Number: 4,914,699
[45] Date of Patent: Apr. 3, 1990

[54] HIGH FREQUENCY ANTI-JAM COMMUNICATION SYSTEM TERMINAL

[75] Inventors: James G. Dunn, San Diego, Calif.; Bruce Lager, Fort Lee; Dennis McCrady, Holmdel, both of N.J.

[73] Assignee: ITT Corporation, New York, N.Y.

[21] Appl. No.: 256,342

[22] Filed: Oct. 11, 1988

[51] Int. Cl.$^4$ .............................................. H04K 1/00
[52] U.S. Cl. ........................................ 380/34; 375/1; 380/46
[58] Field of Search ...................... 380/34, 46; 375/1

[56] References Cited

U.S. PATENT DOCUMENTS 4,365,338 12/1982 McRae et al. ........................... 375/1
4,761,796 8/1988 Dunn et al. ............................ 375/1

*Primary Examiner*—Salvatore Cangialosi
*Attorney, Agent, or Firm*—Thomas N. Twomey; Mary C. Werner

[57] ABSTRACT

There is disclosed a high frequency communication system of the type employing a high frequency terminal which terminal can transmit a processed signal in a transmitting mode or process a received signal in a receiving mode which terminal includes a first subsystem for voice processing, including a processor responsive to voice signals to provide a linear predictive coded voice signal at a given data rate which signal is coupled to a data modem subsystem that digitally encrypts said voice signal which data modem subsystem is coupled to a modem processor subsystem capable of processing said encrypted signal for providing frequency hopping, feedback equalization, intersymbol interference cancellation, error correction and interleaving to provide a transmitted signal which is relatively immune to jamming during said transmitting mode which includes a convolutional encoder means included in said modem processor subsystem responsive to said encrypted signal to provide a convoluted signal at a higher data rate than said encrypted signal at an output. There is an interleave buffer having an input coupled to said encoder outputs for interleaving said higher data rate signal according to an interleaving algorithm, a symbol encoder having one input responsive to said interleave signal and one input coupled to a source of PN training signals as stored to provide at an output an encoded signal encoded according to said PN signal which PN training signal differs for each transmitting frequency. This signal is then converted to an analog signal and eventually coupled to a transmitting means for transmitting said signal. The apparatus also contains receiver means which operate to employ improved equalization for a received signal according to said PN training signal blocks.

21 Claims, 11 Drawing Sheets

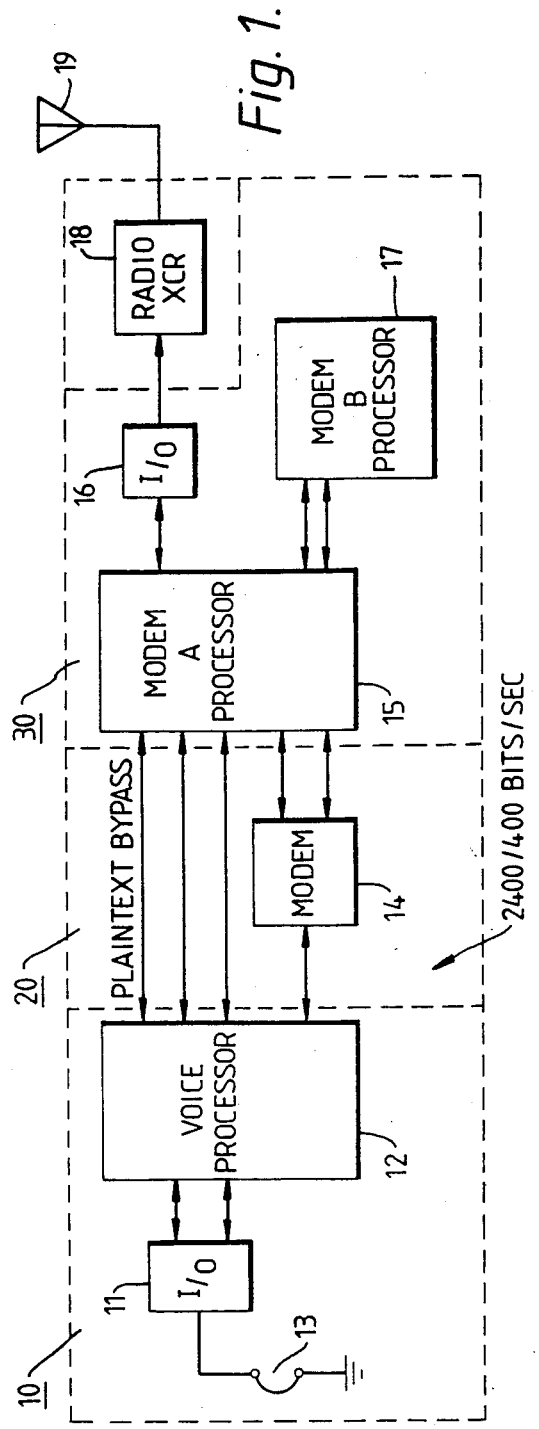

Fig.5.
A
TRANSMIT
SYMBOLS
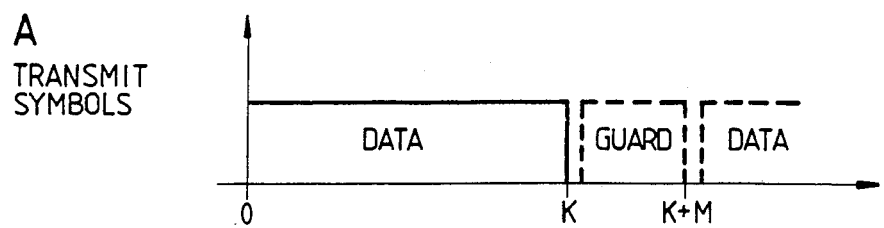
B
CHANNEL
RESPONSE TO A
SINGLE SYMBOL
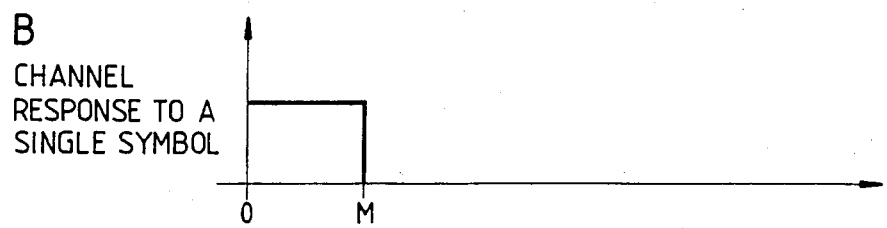
C
CHANNEL OUTPUT
(RX SAMPLES)
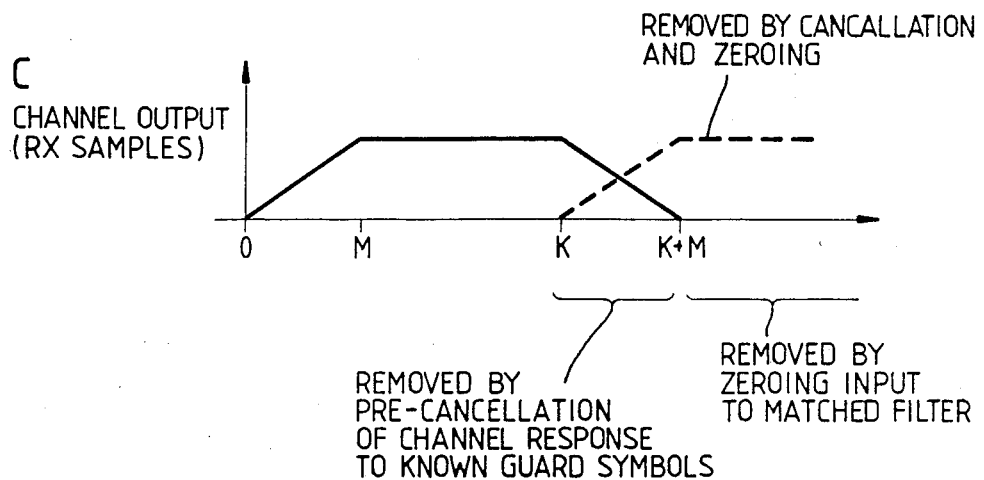

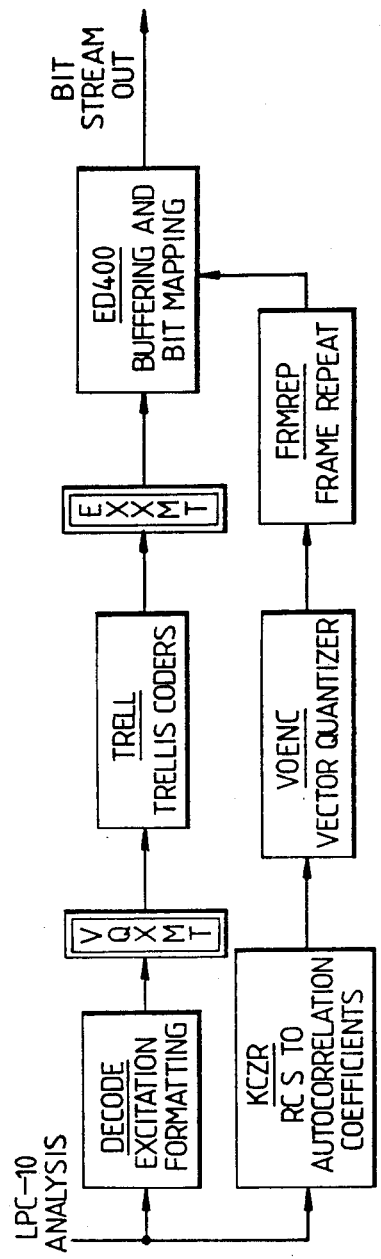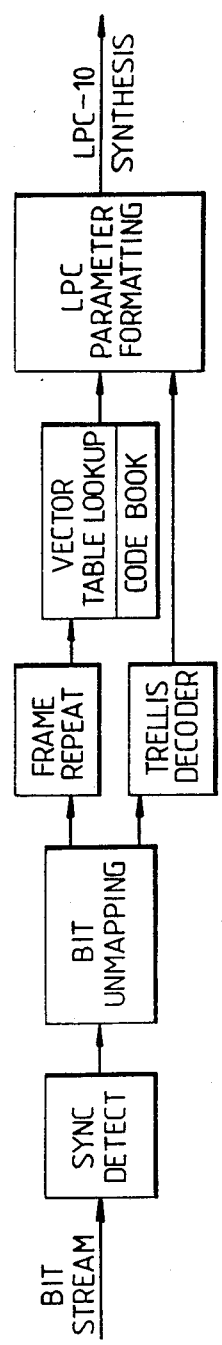

HIGH FREQUENCY ANTI-JAM COMMUNICATION SYSTEM TERMINAL

BACKGROUND OF INVENTION

The present invention relates to a data communication system and more particularly to a modem employed in such a system and used to transmit and receive compressed speech data.

Generally, high frequency (HF), radio voice and data communications have increased in importance in recent years, especially for military applications. As the HF band (2 to 30 MHZ) is more widely used, the need for reliable HF communication links increases. To improve the performance of voice and data modems in terms of bit error rates and immunity to interference and intercept, state of the art equalization, error correction and spread spectrum signal processing techniques must be employed.

Spread spectrum operation can be achieved by pseudo noise (PN) spreading in the modem or by frequency hopping (FH) the radio transmitter and receiver. Frequency hopping operation provides anti-jam or electronic counter counter measure operation (ECCM) capability while frequency hopping, pseudo noise spreading and the use of secure modem systems insure a low probability of intercept and a low probability of exploitation.

Essentially, reference is made to a U.S. Pat. No. 4,761,796 entitled "A High Frequency Spread Spectrum Communication System Termnal", Ser. No. 694,549, filed on Jan. 24, 1985 for J. G. Dunn et al. This application describes in detail a spread spectrum communication system or a modem terminal which essentially consists of a voice subsystem couple to a modem subsystem which is coupled to an RF subsystem. The modem subsystem uses state of the art equalization techniques and spread spectrum signal processing. The terminal of the communications system provides for 4800 bits per second and 2400 bits per second data communication on 6 KHZ and 3 KHZ high frequency channels with frequency hopping by the radio frequency RF transmitter/receiver contained in the RF subsystem. Frequency hopping combined with decision feedback equalization, linear intersymbol interference cancellation, error correction and interleaving in the modem subsystem gives frequency diversity and anti-jam capability. Very low bit rate voice communication in the voice subsystem is also provided by the high frequency communication system terminal. In this mode of operation the modem subsystem uses PN spreading to employ the full bandwidth that is available and to provide additional anti-jam capability. The frequency hopping/PN technique also gives low probability of intercept capability if low transmission powers are used.

As one can ascertain from reference to the above noted application, spread spectrum communication systems have been used in a variety of fields. In such a communication system the transmitted bandwidth is much greater than the bandwidth or rate of the information to be transmitted. The carrier signal is modulated by some other function to widen or spread the bandwidth for transmission.

The receive signal is remapped into the original information bandwidth to reproduce a desired signal. The spread spectrum communication system has many useful advantages, as is well known in the prior art. Such systems can be categorized into a direct sequence system, a frequency hopping system, a time hopping system and a hybrid system which is a proper combination of the systems just mentioned. Of these systems the frequency hopping system is frequently used in the field of mobile communication systems with a low traffic volume for a number of stations. Frequency hopping systems can be employed in satellite communication systems and scatter-type communications system where a fading environment is present.

In the frequency hopping system a carrier frequency is shifted or jumped in discrete increments in a pattern dictated by a prepared code or sequence, for instance, a PN code (pseudo noise), M sequence codes, Gold codes and the like in synchronism with a change in the state of the codes. The resulting consecutive and time sequential frequency pattern is called a hopping pattern and the duration of each hopping frequency is called a chip. The transmitted information is embedded in the codes or embedded in each frequency of the carrier wave by a so-called FSK (frequency shift keyed) or PSK (phase shift keyed) modulation. The information signal thus spread spectrum modulated can be reproduced at the receiver. Generally speaking, in reproducing the information signal at the receiver a synchronization acquisition process is first performed in which the code pattern provided in the receiver is made accurately coincident with the code pattern generated in the transmitter in time position. Then the spread spectrum signal is despread and thereafter a well known demodulation is performed to extract the desired information.

More particularly, a local reference signal of a frequency correspondingly determined by the same code pattern as that in the transmitter for every chip and the received signals are mixed in a mixer in order to perform a correlation (despreading) process for converting the spread spectrum signal into the signal having a frequency bandwidth wide enough to extract the information. This system is described in detail in "Spread Spectrum Systems" by R. C. Dixon published by John Wiley and Sons, Inc. (1976). Following this spreading process the desired information is extracted by usual demodulation techniques.

In general, in order to implement a frequency hopping communication system the terminal to be described is interfaced to a radio that is capable of frequency hopping the packets provided by the terminal. Many examples of such radios exist. As will be explained, the system according to this invention employs two types of frequency hopping modes. The first type is a Slow Hopping or High Data Rate (HDR) mode, which operates in 2400 voice, 2400 data or rekey modes. A Fast Hopping, or Low Data Rate (LDR) mode operates in 400 or rekey modes. The 2400 Voice Mode operates in conjunction with a standard voice processor utilizing linear predictive coding (LPC) which is well known in the prior art. The 400 Voice Mode has an additional voice processor function which converts standard 2400 LPC to 400 bits per second voice data.

As indicated, the modem to be described is a secure digital voice and data terminal. It is designed to interface with HF radios to provide a complete communication system. The terminal is particularly designed to interface with various military receivers, such as those manufactured by the Hughes Aircraft Company of California. Such radios implement frequency hopping modes which are compatible with the enhanced modes, as will be further described and which are available by the use of this terminal. The radio provides for the generation of the frequency hopping pattern and the actual shift in the carrier frequency. It also provides for the initial synchronization acquisition processes.

In any event, as one can further understand, jammer resistance is improved by increasing the rate of frequency hopping. A method of jamming when the frequency hopping is slow is for the jammer to repeat back the communication systems own signal. Thus, as one can ascertain, the jammer may be a communications transmitter and receiver combination whereby it is capable of repeating back the generated signal from the communication systems. If the delay of the repeat back interference is short compared to the packet duration, it will interfere with the communication signal. Thus, it is desirable to use as high a rate of frequency hopping as feasible to minimize the possibility of this type of jamming.

In any event, higher data rates can be transmitted by coherent, multi-phase modulation but reception from an HF channel requires equalization to remove intersymbol interference caused by multi-path spread of the received data symbols. Equalization, in turn, requires measurement of the channel response by means of a transmitted training signal. In a frequency hopping system each packet experiences a different channel response because it is at a different carrier frequency. This means that a training signal must be transmitted during each packet. The duration of the training signal must be greater than the duration of the multi-path spread.

The efficiency of the overall data signal is determined by the fraction of the packet which is used for training data. Thus, for good efficiency, the packet duration for a high data rate system must be much longer than the multi-path spread. Thus a high data rate system, using slow frequency hopping, is more susceptible to jamming.

On the other hand, fast frequency hopping systems are limited to incoherent modulation without any training signals which inherently provide a lower data rate. In a system which uses a training signal it is desirable that the data pattern be randomized by PN coding or the like so that it is different for each frequency hop. If it is the same for every frequency hop the system is easier to jam because the fixed training sequence can be transmitted as a jamming signal. However, it is more difficult to use a training signal which is different for each frequency hop.

It is therefore an object of the present invention to provide an improved high frequency communication system which system employs improved anti-jamming techniques.

It is a further object of the present invention to provide a high frequency anti-jam communication system which provides anti-jam protection by means of frequency hopping and error correction coding.

It is a further object of the present invention to provide a high frequency anti-jam communication system terminal which provides unique frequency hopping modes.

SUMMARY OF THE INVENTION

In a high frequency communication system of the type employing a high frequency terminal which terminal can transmit a processed signal in a transmitting mode or process a received signal in a receiving mode, which terminal includes a first subsystem for voice processing including a processor responsive to voice signals to provide a linear predictive coded voice signal at a given data rate, which signal is coupled to a data modem subsystem to digitally encrypt said voice signal which data modem subsystem is coupled to a modem processor subsystem capable of processing said encrypted signal for providing frequency hopping, feedback equalization, intersymbol interference cancellation, error correction and interleaving to provide a transmitted signal which is relatively immune to jamming during said transmitting mode, the improvement therewith of apparatus for providing an improved transmitting operation comprising a convolutional encoder means included in said modem processor subsystem and responsive to said encrypted signal to provide a convoluted signal at a higher data rate than said encrypted signal at an output an interleave buffer having an input coupled to said encoder output for interleaving said higher data rate signal according to an interleaving algorithm; a symbol encoder having one input responsive to said interleaved signal and one input coupled to a source of PN training signal as stored to provide at an output an encoded signal encoded according to said PN signal which PN training signal differs for each transmitting frequency; a transmitting filter means responsive to said encoded signal and operative to limit the bandwidth of said signal; and a digital to analog converter means coupled to said transmitting filter means and operative to convert said limited bandwidth to an analog signal.

BRIEF DESCRIPTIONS OF FIGURES

FIG. 1 is a basic block diagram of a communication system terminal in accordance with the principles of this invention;

FIG. 2 illustrates the packet format for each of the two modes of operation of the communication system terminal of FIG. 1;

FIG. 5 is a series of timing diagrams illustrating the function of the precancellation algorithm according to this invention;

FIG. 11 is a block diagram of the LDR transmit functions in the voice processor algorithm;

FIG. 13 is a block diagram of the LDR receive functions in the voice processor algorithm.

DETAILED DESCRIPTION OF INVENTION

Figure 3:
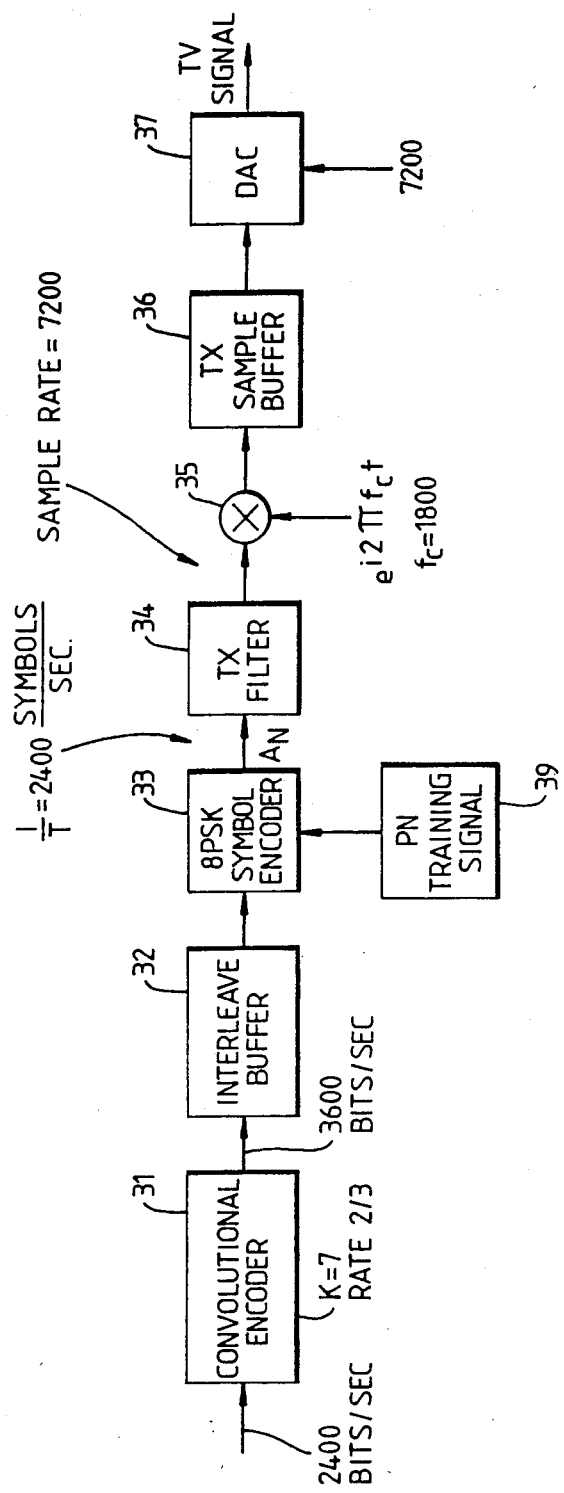
FIG. 3 is a block diagram illustrating the algorithm for the high data rate (HDR) transmission function of the terminal of FIG. 1.

Referring to FIG. 1 there is illustrated a general block diagram of a terminal for a high frequency frequency hopping communication system in accordance with the principles of the present invention. As shown in FIG. 1, there is a first subsystem generally designated by the reference numeral 10. The first subsystem 10 is a voice processing system which typically includes a handset 13 which is coupled to an input/output device 11. The input/output device 11 is bidirectionally coupled to a voice processor 12. The voice processor 12 utilizes linear predictive coding (LPC) to provide voice communication at 2400 bits per second. The processor also provides state of the art low bit rate voice communications at 400 bits per second.

Coupled to the subsystem 10, as indicated briefly above, is a modem system 20. The modem system 20 is also well known and provides for digital encryption of the 2400 and 400 bits per second data signal. The modem 20 thus enables the system to provide secure communication of voice and data.

Also shown is a subsystem 30. Subsystem 30, contains two modem processors, namely 15 and 17. As will be explained, the modem processors operate to control the modem 14 and to also interface with an input/output device 16 which interfaces directly with a radio transceiver 18 for the transmission or reception of radio signals via the antenna 19. The subsystem 30 essentially is a modem processor system which employs state of the art equalization techniques and signal processing. It provides for 2400 and 400 bits per second data communication on 3 KHZ high frequency channels with frequency hopping by the external HF radio 18. Frequency hopping, combined with decision feedback equalization, linear intersymbol interference cancellation, error correction and interleaving in the modem subsystem 30 gives frequency diversity and anti-jam capability.

As will be further explained, the high frequency communication system provides the following capabilities.

1. 2400 bits per second and 400 bits per second voice and data communication and a 3 kHz bandwidth high frequency channel.

2 Frequency hopping operation during communications at the above-noted data rates.

Operation of the frequency communication system shown in FIG. 1 will now be briefly given. Essentially data flow through the terminal is shown in FIG. 1 and operates as follows. First assume that a voice mode has been selected. For a voice mode the handset 13 signal is digitized by means of the input/output device 11 which essentially contains an 8.0 KHZ Codec and this digital information is sent to the voice processor unit 12 for rate reduction to 2400 bits per second or according to a 400 bit per second algorithm.

The output signal from the voice processor 12 is coupled to the modem 14 where it is encrypted and passed to the modem processor module 30. The encrypted signal is encoded, modulated and filtered by the modem processors 15 and 17 before it is sent to the I/O device 16. The I/O device 16 operates to convert the digital signal to an analog signal by the use of a D/ converter which is performed by a 7.2 kHz Codec. The analog signal is then coupled to the external radio 18 where it is transmitted.

On the receiver end the radio 18 acquires synchronization and sends the audio signal to the I/O device 16 for processing. This audio signal is digitized by the I/O device and passed to modem processor 15 and modem processor 17 where it is demodulated and decoded. The decoded data are sent to the modem 14 for decryption and then to the voice processor 12 where the compressed voice is restored to full rate. The full data rate is then converted by means of a digital to analog converter by the codec contained in the I/O device 11 and then sent to the handset 13 for the listener to respond to.

As will be explained, in circumstances where jamming is not a threat, terminal non-hopping modes can be selected and configured with a corresponding non-hopping modem. In this manner the entire function of the modem 14 is bypassed and voice data, which is digitized by the input/output device 11, is passed to the modem processor where it is then converted to analog information by input/output device 16 and transmitted directly by the radio transceiver 18.

As will be explained, the present system utilizes an anti-jamming technique where either of the above-described hopping modes can be selected and configured with a corresponding hopping radio depending upon the nature of the threat. The system, as shown generally in FIG. 1, employs many of the same components and subsystems as shown and completely described in the above-noted copending application which is incorporated herein.

As will be further explained, the signal processing in a modem subsystem 30 can be described by two different sets of algorithms. The high data rate (HDR) algorithms are used when the data rates are 2400 bits per second. These algorithms are used when the frequency hopping rate is slow. These algorithms, as will be explained, are similar to those described in the above-noted co-pending application. The differences between the algorithms employed according to this invention will be described below.

The low data rate (LDR) algorithms are used when the data rates are 400 bits per second. The LDR algorithms are used when the frequency hopping rate is fast. As will be explained, the modem subsystem 30 processes data separately during each frequency hop. The data transmitted during one frequency hop is called a packet. The packet formats for the two modes of operation are shown in FIG. 2.

Referring to FIG. 2A there is shown the packet format for the high data rate (HDR) mode. As seen, an idle time during which no signal is transmitted is provided between each packet to allow the HF radio time to switch to a new frequency. The packet in the HDR mode is divided into blocks of PN training symbols, $T_0 \ldots$ to $T_5$ and blocks of data symbols $D_1 \ldots$ to $D_5$. Each data block is short relative to the fading rate of the HF channel so that the channel impulse response does not change appreciably during a block. The duration of the training blocks is greater than the duration of the expected multipath spread.

Referring to FIG. 2B, there is shown the packet format for the LDR mode or the low data rate mode. Essentially, as one can see from FIG. 2B, data is separated by idle time. During a data interval the first portion of the data interval is designated as a guard interval while the second portion is a DFT integration interval where DFT stands for Discrete Fourier Transform. This transform is employed by the system to implement operation as will be explained.

Referring to FIG. 3 there is shown the algorithm for the transmitter function for the HDR mode. A difference between this algorithm and the algorithms contained in the above-noted application is that a randomized PN training signal indicated by module 39 is used such that it is different for each and every frequency hop. This is done to make the system harder to jam. The main algorithms and the HDR transmitter function, which are the same as in the previous invention, are the convolution error correction encoder 31 and the interleave buffer 32 which interleaves the data. The interleave buffer 32 is coupled to the input of an 8 PSK symbol encoder which phase shift key modulates the data symbols and the output of the encoder 33 is coupled to the transmit filter 34 (TX) which serves to filter the encoded symbols. The symbol encoder 33 is operated on by the pseudo noise training signal module 39. The output of the transmit shaping filter 34 is applied to a multiplier 35 which takes the symbol output from the filter 34, which is at a sample rate of 7200 HZ, and multiplies the symbols by an exponential function, as indicated in the Figure where fc equals 1800. The output of the multiplier is sent to a sample buffer 36 whereby the samples of buffer 36 are converted to analog signals in the digital to analog converter 37. This digital to analog converter 37 operates at a 7200 Hz sampling rate to provide the analog transmit signal which is the signal coupled to the radio transceiver 18 and transmitted via antenna 19.

It is of course understood that the modules contained in FIG. 3 are implemented by means of the modem A processor 15 and the modem B processor 17 of FIG. 1. These processors, as will be further explained, operate in conjunction with one another and modem B processor 17 operates to exchange data and control signals with the modem A processor 15. The digital to analog converter 37 is contained in the input/output module 16 of FIG. 1 which is coupled to the modem A processor 15 and modem B processor 17.

Essentially, as shown in FIG. 3, the convolutional encoder 31 operates on the 2400 bit per second input which is obtained from the output of the modem 14 of FIG. 1 and operates according to a fixed coefficient K to multiply the effective bit rate by 3/2 to obtain a 3600 bits per second signal at the output. The function of the convolution encoder is to essentially scramble the bits to insure randomness over a packet interval.

The interleave buffer 32 contains an interleaving algorithm which is implemented by the modem A processor. The PSK encoder 33 modulates the output data from the interleave buffer into a phase shift key signal which is then operated on by a randomized PN training signal 39 which is stored in the modem processor. The PN training signal as stored is a block of known PN training signals.

The filter characteristics of filter 34 are chosen to limit the peak to RMS (root means square) power ratio of the transmitted signal to less than 2 DB and to restrict the bandwidth of the transmitted signal. The filter impulse response is given by the following expression:

$$h(k) = \sin(\pi k b)/(\pi k b) \cos(\pi a k b)/(1 - (2 a k b)^2)$$

where
k is the sample index
a is a constant between 0 and 1
b is a constant related to the product of the sampling interval and the filter 3 dB bandwidth The complete operating details for the filter are described in the copending application.

Figure 4:
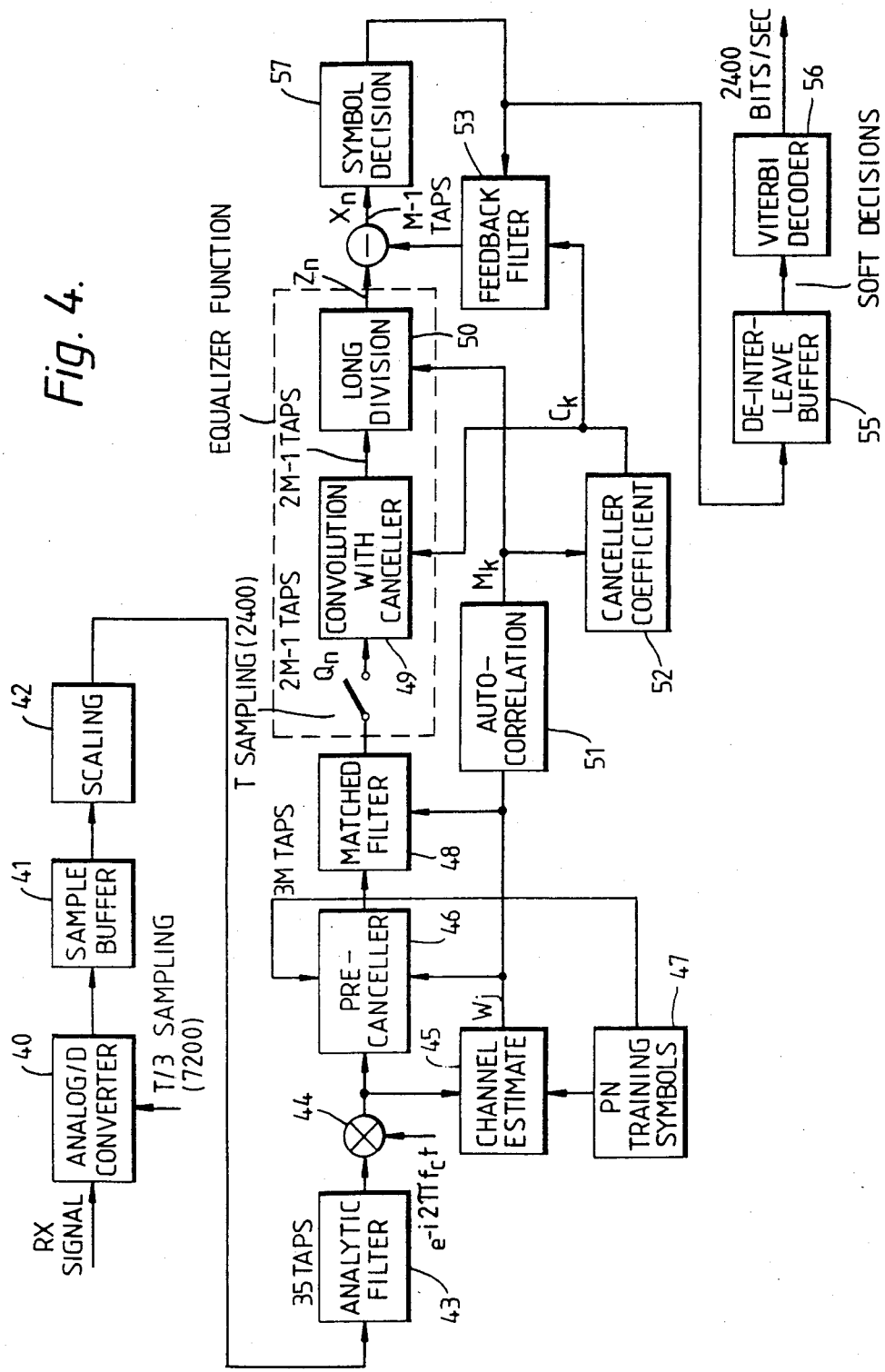
FIG. 4 is a block diagram illustrating the algorithm for the HDR mode for the receiving operation of the terminal of FIG. 1.

The algorithm for the receiving function in the HDR mode is shown in FIG. 4. The main differences between this algorithm and that of the previous invention is the means for making the HF channel impulse response estimate, the precanceller 46 and the algorithms for calculating the equalizer coefficients and for performing equalization. The other algorithms in the receiver, which are the same as in the previous co-pending application, are the analytic filter 43 which generates a complex form of the receive signal, the matched filter 48, which minimizes the effect of noise, the decision feedback filter 53, the de-interleave buffer 55, and the Viterbi decoder 56.

The channel estimate algorithm uses the blocks of known PN training symbols to make an initial estimate of the HF channel impulse response and to update this estimate during the packet. The estimate used to calculate the matched filter and equalizer parameters for data block $D_k$ uses training blocks $T_0, \ldots, T_k$ (FIG. 2)

A least squares algorithm is used to estimate the channel impulse response based on observations of the channel output in response to a known training sequence as channel input. Let M be the maximum number of symbols duration of the channel impulse response and N+M be the number of training symbols in a training block. The received signal at 2400 HZ is converted to a digital signal by the A/D converter 40 which is sampled at 7200 Hz or at three times the input data rate. The receive signal is sampled at three times the symbol rate, that is, there are three channel output samples for every input symbol. The output bits of A/D converter 40 are stored in buffer 41 and are scaled accordingly by scaling module 42 to provide 3 samples for each input symbol. The unknown channel impulse response is denoted $h'_{j'}$, $j' = 0, \ldots, 3M-1$, and the channel output by $y'_{n'}$, $n' = 0, \ldots, 3(N+M)-1$.

The channel output which is observed is:

$$y'_{n'} = \sum_{j'=0}^{3M-1} h'_{j'} a_{n-j} + \text{noise and/or distortion}, \quad n' = 3M, \ldots, 3N + 3M - 1.$$

That is, the observation samples $y'_{n'}$ are not necessarily just the ideal response of the channel impulse response to the training sequence.

The channel impulse response samples can be grouped into three sets as follows:
$h^{(0)} = (h'_0, h'_3, h'_6, \cdots)$
$h^{(1)} = (h'_1, h'_4, h'_7, \cdots)$
$h^{(2)} = (h'_2, h'_5, h'_8, \cdots)$
and similarly for $y'_{n'}$. Specifically, we set
$h_j^{(v)} = h'_{3j+v}$, $j = 0, \cdots, M-1$, and $v = 0, 1, 2$.

and similarly for $y_n^{(v)}$. The reason for this grouping is that the estimate for each group is independent of the other groups. The algorithm is applied three times to each group v separately.

The algorithm makes an estimate, $w_j^{(v)}, j=0, \cdots, M-1$, of the unknown channel impulse response given these possibly noisy samples of the channel output. The covariance matrix and cross-correlation vector used to make the estimate for data block $D_k$ are defined as $$R_i^{(k)} = pw \cdot R_{ji}^{(k-1)} + \sum_{n=M}^{N+M-1} a_{n-j} \bar{a}_{n-i}, i = 0,$$
$$\ldots, M-1, j = 0, \ldots, M-1$$

$$Q_i^{(v,k)} = pw \cdot Q_i^{(v,k-1)} + \sum_{n=M}^{N+M-1} y_r^{(v)} \bar{a}_{n-1}, i = 0, \ldots, M-1,$$

where the bar denotes complex conjugate, $0 < pw < 1$ and the summations are over the last N symbols in the training block $T_k$. $R_{ji}^{(k)}$ and $Q_i^{(v,k)}$ are zero for $k < 0$.

These quantities are used in the normal equations $$\sum_{j=0}^{M-1} R_{ji}^{(k)} w_j^{(v)} = Q_i^{(v,k)} i = 0, \ldots, M-1$$

The normal equations are a set of M linear, simultaneous equations which are solved for each v separately to give the estimate $w_j^{(v)}$ used to calculate the matched filter 48 and equalizer parameters for data block $D_k$. A Choleski decomposition algorithm is used for this solution.

The decision feedback equalization algorithm processes each data block independently. For each symbol decision, via module 54, the intersymbol interference due to two sets of known symbols are cancelled. This is accomplished by the pre-canceller 46 and feedback filter 53 using the canceller coefficients 52. The coefficients 52 are applied to convolution with canceller module 49. The convolution module 49 has the output coupled to a long division module 50 which receives an input from autocorrelation module 51 which also supplies an input to canceller coefficient module 52. The module 49 and the long division module 50 perform an equalizer function. The cancelled symbols are symbols previous to the present data symbol and symbols which follow the present symbol. Previous known symbols can be either training symbols or data symbols already decided. These are cancelled by the feedback canceller in module 49. Intersymbol interference due to data symbols which follow the present data symbol is minimized by the equalizer of modules 49 and 50.

The known symbols which follow the present data symbol are the training symbols in the training block immediately following the present data block. These are cancelled by the pre-canceller 46. The pre-canceller 46 uses cancellation prior to the matched filter 48 and equalizer and allows the receive samples to be separated into blocks for independent processing. This, in turn, allows the use of the long division equalizer algorithm discussed below.

FIG. 5 illustrates the pre-cancellation algorithm. The first figure A shows the present data block of K symbols, M known "guard" (training) symbols and subsequent data (or training) symbols. The pre-cancellation algorithm removes the effect on the receive samples of both the guard and subsequent data symbols. The result is as if nothing follows the present transmitted data block.

The second diagram B illustrates the channel impulse response. The channel output, shown in C, is the result of convolving this impulse response with the transmit symbols. The channel response causes the present data block to be spread out to cover $K+M$ symbol intervals. In addition, it causes response due to the guard symbols to overlap the last M symbol intervals.

The pre-canceller 46 generates this overlapping response by convolving the known guard symbols with the channel estimate and subtracting it from the receive samples. This removes the effect of the guard symbols from the M overlapping symbol intervals. The receive samples beyond these overlapping symbols are zeroed. The result is a block of $3(K+M)$ receive samples which are passed through the matched filter 48.

The decision feedback filter 53 is initialized with the M known training symbols immediately prior to the present data block. In this way, their intersymbol interference is cancelled from the beginning of the present data block. Thus, the receive samples due to the present block of data symbols are isolated for subsequent processing by the matched filter and equalizer.

In the previous invention, the equalizer was a feedforward transversal filter with K taps. The transfer function of this filter can be written as $$G(z) = \sum_{k=-K+1}^{0} g_k z^{-k}, z = e^{j2\pi/T}$$

The processing is on stored blocks of data so that even though this transfer function is of an anti-causal filter, it is realizable in the modem application. Thus, G(z) is a finite polynomial in z with K non-zero coefficients. In the previous invention, the filter coefficients were obtained by solving a set of K linear equations. These equations will now be expressed in the form $$M(z) G(z) = C(z).$$

where M(z) is the z-transform of the autocorrelation function of the estimated channel impulse response. Since the channel impulse response is limited to M symbols duration, M(z) is also a finite polynomial with $2M-1$ non-zero coefficients in the range of $z^{-(M-1)}$ to $3^{(M-1)}$. The coefficient of $z^k$ is the complex conjugate of the coefficient of $z^{-k}$. C(z) is a finite polynomial with non-zero coefficients in the range of $z^{-(m-1)}$ to $z^{(m+k-2)}$.

The linear equations in the previous invention served to constrain the coefficients of C(z) in the range $z^0$ to $z^{K-1}$; the coefficient of $z^0$ being 1 and the others 0. the remaining coefficients represent the canceller coefficients. The coefficients of $z^{-1}$ to $z^{-(M-1)}$ are the coefficients of the decision feedback filter. The coefficients of $z^K$ to $z^{K+M-2}$ are the coefficients of a feedforward canceller filter which is not needed because its function is performed by the pre-canceller.

Instead of using the feedforward equalizer G(z), the present invention uses a long division algorithm based on the representation $$G(z) = \frac{C(z)}{M(z)}.$$

In this algorithm the output of the matched filter 48 and T sampler switch (T sampling) is first convolved with the coefficients of C(z). Then the result is divided by the polynomial M(z). This has significant processing advantage when the length of the data block K is relatively long compared with the duration of the maximum multipath spread M. Instead of solving a set of linear equations of large order, K, a recursion for C(z) involving only $2M-1$ non-zero coefficients is used. Similarly, instead of the equalizer filter of length K, convolution with the $2M-1$ coefficients of C(z) and division by the $2M-1$ coefficients of M(z) is used.

The recursion for the canceller polynomial is $$\dot{D}_m(z) = D_{m-1}(z) - k_m z^{-m} D_{m-1}(1/z)$$

$$C_m(z) = C_{m-1}(z) + h_m z^m D_m(z)$$

where $D_m(z)$ is an auxiliary polynomial. Initially, $D_0(z) = M(z)$, $C_0(z) = h_0 M(z)$ and $h_o = 1/M_0$. Then the recursion is repeated for $m = 1, \cdots, K-1$ finally giving $C(z) = C_{K-1}(z)$.

It has already been noted that $C_m(z)$ has only $2M-1$ non-zero coefficients of which the coefficient of $z^0$ is unity. The coefficients of $\{z^m, hu \ldots, z\}$ are constrained to be zero by the recursion. Similarly, $D_m(z)$ also has only $2M-1$ non-zero coefficients of which the coefficient of $z^{M-1}$ is $M_{M-1}$ and the coefficients of $\{z^{-1}, \cdots, z^{-m}\}$ are constrained to be zero by the recursion. Thus, the recursions for $C_m(z)$ and $D_m(z)$ require only $4(M-1)$ coefficient updates per iteration.

Additional equations used with the recursion are $$k_m = \frac{d_m^{(m-1)}}{d_0^{(m-1)}},$$

and $$h_m = \frac{-c_{-m}^{(m-1)}}{d_0^{(m)}},$$

where $c_k^{(m)}$ and $d_k^{(m)}$ are the coefficients of $z^{-k}$ in the polynomials $C_m(z)$ and $D_m(z)$, respectively.

Figure 6:
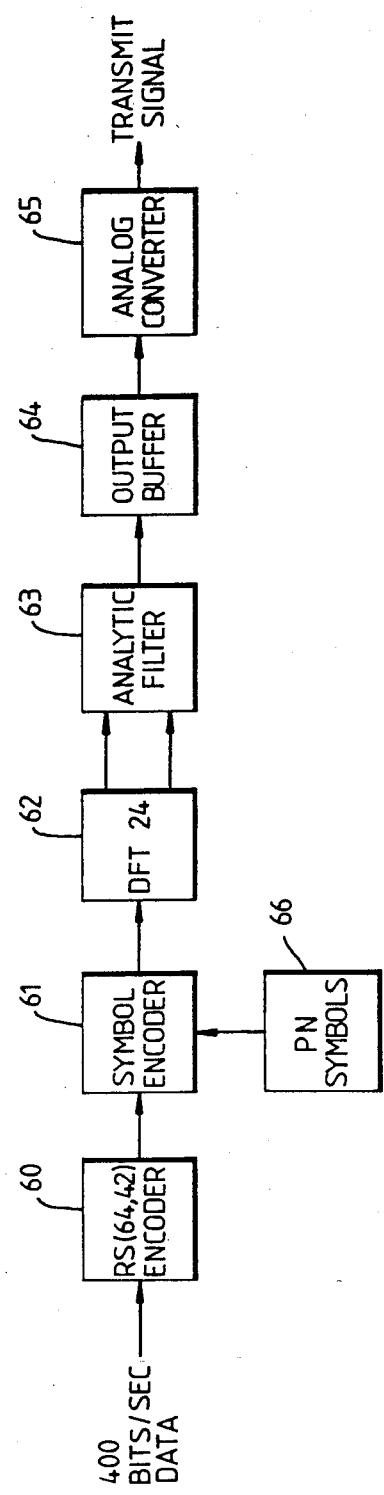
FIG. 6 is a block diagram illustrating the transmit algorithm for the LDR or low data rate mode of operation of the terminal of FIG. 1.

The algorithm and functional data flow for the transmitter functions of the modem subsystem operating in the LDR mode is shown in FIG. 6. In this mode of operation the input data rate is 400 bits per second. These data bits are encoded by the rate ⅔ Reed-Solomon (RS) error correction coder 60 to give 600 bits per second in the form of 6 bit groups, each group corresponding to a RS codeword symbol.

Prior to sending data symbols, a sequence of eight known PN symbols are transmitted to allow the receiver to make an initial Doppler frequency estimate. This is done via module 66 coupled to symbol encoder 61.

Each 6 bit symbol is transmitted as a different frequency hopping packet. This gives the system a form of diversity which minimizes the effect of fading on the HF channel. Since each symbol is on a different frequency, it fades independently of the other symbols in a 63 symbol RS codeword. The code has a 21 symbol redundancy which means that up to 10 symbols can fade without causing a decoding error.

The transmitter uses a Discrete Fourier Transform (DFT) 62 to generate 24 tone slots spaced by 150 Hz. The tone map function selects 2 tone frequencies out of 12 of these tone slots which may be used for a transmit signal. There are 66 such combinations possible of which only 64 are needed for a 6 bit symbol.

Figure 7:
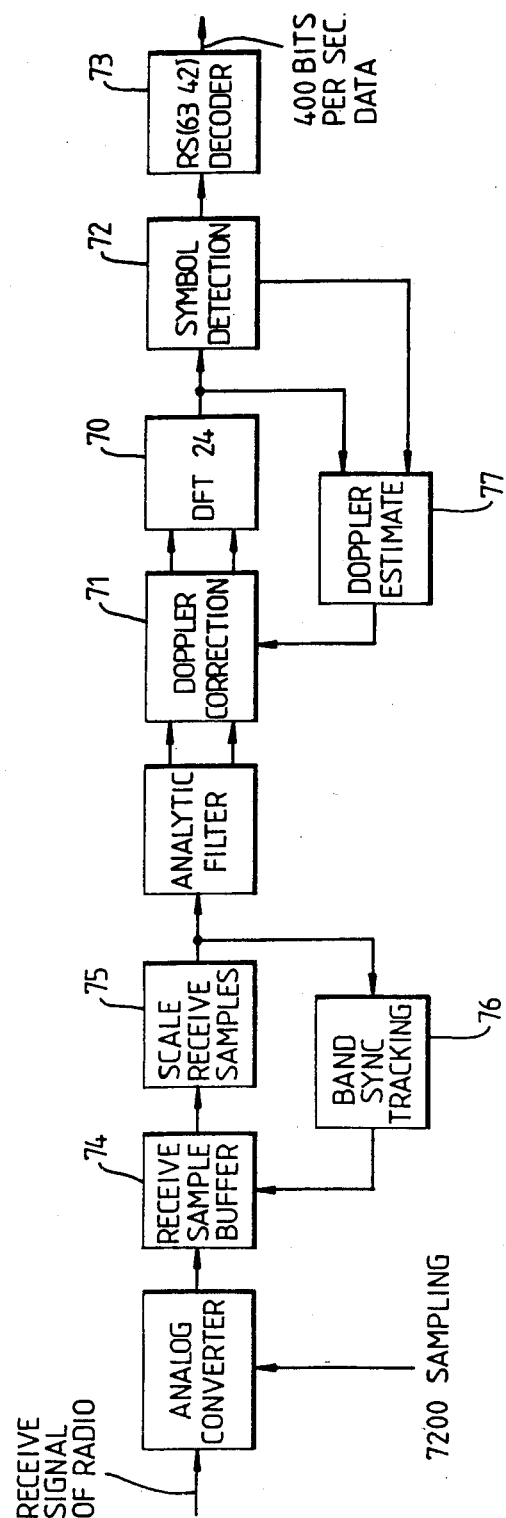
FIG. 7 is a block diagram illustrating the algorithm for the LDR receive mode of operation of the terminal of FIG. 1.

The functional flow and algorithm for the receiver functions in the LDR mode of operation is shown in FIG. 7. A DFT 70 is used to measure the complex amplitude of receive tones in the 12 tone slots. Doppler correction 71 of the receive signal is provided to ensure that the receive tones are properly centered in their tone slots. This is accomplished by providing a Doppler estimate in module 77 by comparing the output of the DFT 70 with the detected symbols from module 72 to arrive at an error signal used to compensate the input signals to the DFT 70 via the Doppler correction 71.

Symbol detection 72 is done by determining the two tone slots which have the greatest receive energy, i.e., have the greatest magnitude. This form of incoherent detection does not require any training and is independent for each frequency hop. The RS decoding 73 provides protection against fading and jamming of some of the symbols in a codeword.

The packet format provides for a guard interval before the samples are processed by the DFT 70. This interval is greater than the expected multipath duration so that the tone signals settle to a steady state before the DFT operation. This provides the system with immunity to multipath spread of the HF channel. In addition, the symbol duration is very short with this fast frequency hopping mode so that the system is not affected by fading rates normally experienced on a HF channel.

The receive samples for each packet are stored in the receive sample buffer 74. The packet boundaries are determined by the frequency hopping clock from the HF radio. The modem uses a further timing estimate of the position of the receive data baud within this buffer. This is done by scaling the received samples in module 75 and using a baud sync tracking module 76 for control of the receive sample buffer 74. This is necessary to properly position the DFT integration window to follow the multipath guard interval and to track any drift in the HF radio clock.

Figure 8:
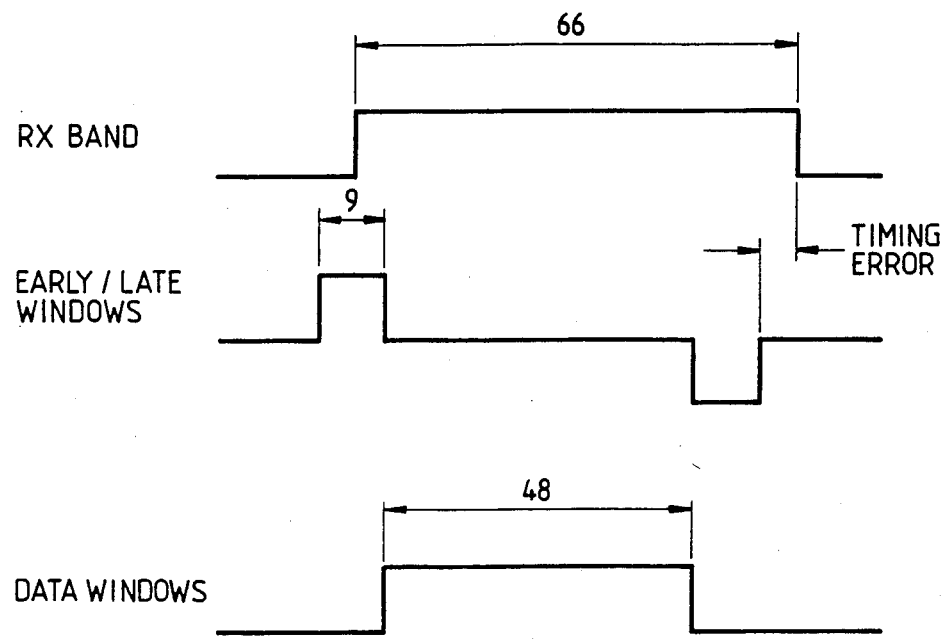
FIG. 8 is a series of timing diagrams illustrating the timing error estimation algorithm.

As shown in FIG. 8, this function uses early and late windows at the edges of the Rx baud. The window positions selected are at the beginning and end of the expected baud position in the receive sample buffer. The sum of the squares of the receive samples within the early and late windows, respectively, are accumulated. The output timing error estimate is the difference between these two energies.

This estimate is accumulated in a register which is monitored on each baud. If the accumulated timing error becomes too large or too small, the pointer to the DFT window within the receive sample buffer is decremented or incremented and the corresponding correction made to the accumulated timing error.

The doppler acquisition function uses the first eight known transmitted symbols to make an initial estimate of the doppler frequency offset of the receive signal. During these receive symbols, this function updates the tone slot energies low, center, and high. These are averages of the energies in the two expected tone slots (center), the tones slots below the expected tone slots (low) and the tones slots above the expected tone slots (high).

These energies are used to compute the initial estimate of the doppler frequency error. In this computation, it is first necessary to determine whether the low or high energy is greater. If the low energy is greater than the high, then the sign of the frequency estimate is negative. Otherwise it is positive.

The frequency estimate depends on the energy ratio $z = B/A$, where A is the center energy and B is greater of the low or high energies. An exact formula for the frequency estimate is $$\text{freq} = 150 \frac{b}{a + b},$$

where, $$\alpha = \sqrt{A} \text{ and } b = \sqrt{B}.$$

This formula is only exact when the additive noise is zero. When noise is present, the formula is still quite accurate for large frequency offsets, i.e., 30 to 75 Hz. However, the accuracy deteriorates for small frequency offsets and is extremely sensitive to small noise errors at zero frequency offset. These errors are not too serious because the symbol detection is not sensitive to frequency offsets below about 30 Hz.

A modification of the exact formula is used for values of z less than $\frac{1}{8}$. This is to make it less sensitive to noise at small frequency offsets. The formula is:

$$\text{freq} = 150 \, (3.65413z - 12.51599z^2).$$

Figure 9:
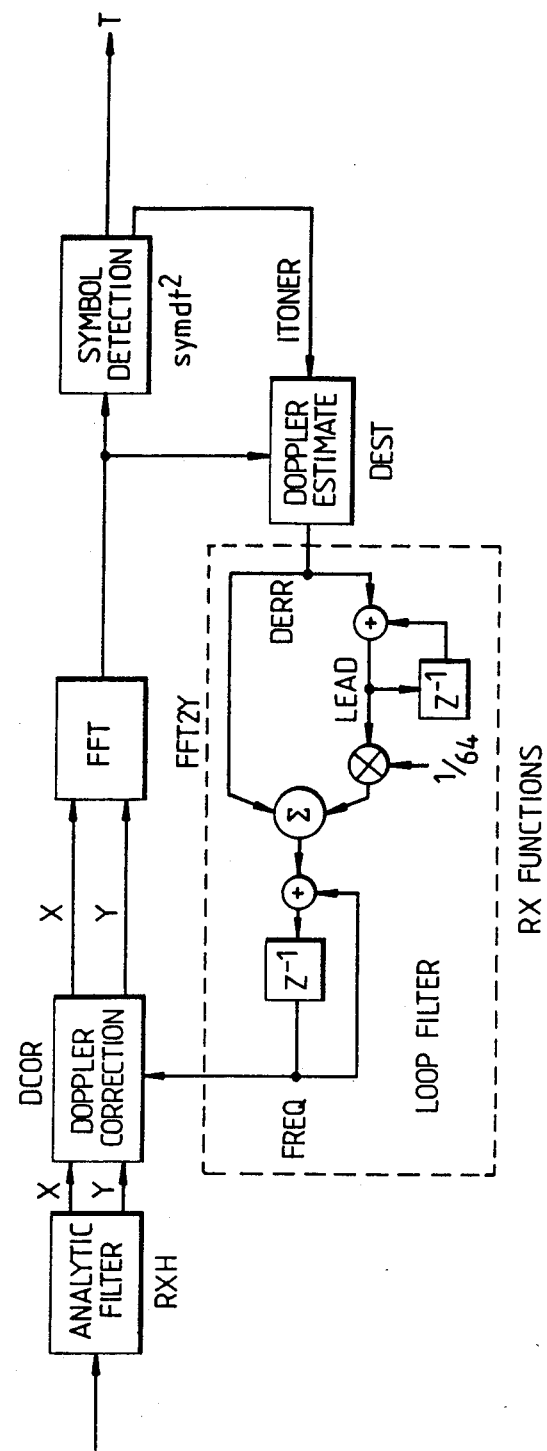
FIG. 9 is a block diagram illustrating the Doppler estimation and correction loop employed for Doppler estimation according to this invention.

The doppler frequency offset in the receive signal is compensated for with a doppler correction operation using an estimated doppler frequency. Following symbol detection, the known tone sequence is used with the receive tone amplitudes to estimate the residual frequency error after doppler correction. The error signal is used in a feedback loop to correct the estimated doppler frequency (FIG. 9). A loop filter is used to give a second order loop response.

The receive tone amplitudes are used by the symbol detection function to determine the two tones with the largest amplitude. This determines the receive symbol and also an array itones which is for use in estimating the residual doppler error. This array has a one in the two locations corresponding to the largest receive tones and zeros otherwise.

The doppler estimate function uses the actual receive tone amplitudes and the itones array. The discrete Fourier transform determines the complex amplitude in each of 24 tone slots. However, due to its finite time window, the equivalent response of each tone slot has a $$\frac{\sin x}{\psi}$$

characteristic. This causes significant sidelobes in the raw tone amplitudes. These sidelobes are reduced and the tone slot width is broadened in the subroutine by a Hanning operation. This convolves the complex tone amplitudes with the sequence {.5,1,.5}.

Since the tones are not coherent, it is necessary to use their energies in measuring the frequency error with respect to their nominal locations in the center of each tone slot. This is done by computing a low and a high energy and the resulting residual frequency error estimate is the difference between these two energies. The low energy is the sum of the energies in the two slots just below the slots indicated by itones and similarly for the high energy.

The frequency estimate freq is made by a feedback loop in which the estimate is corrected by the doppler error signal. One way of doing this is to accumulate the error signal derr to give freq. However, this results in a first order loop which has a sluggish response to a frequency error. The figure shows the loop filter which gives a second order response.

Figure 10:
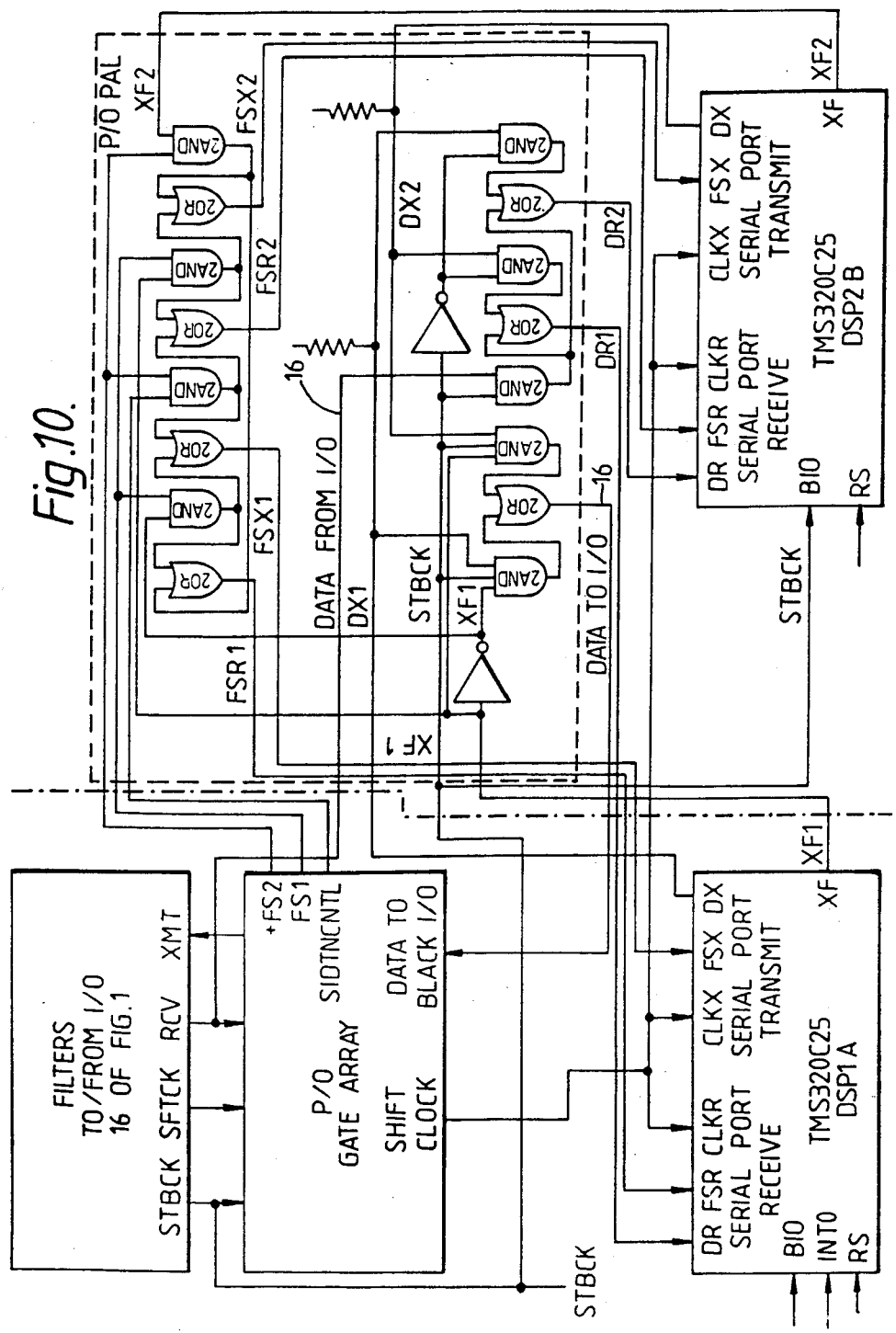
FIG. 10 is a block diagram of the modem processor subsystem of FIG. 1.

FIG. 10 is a more detailed diagram of the modem subsystem 1. A pair of TMS320C25 digital signal processor devices are used to implement the above signal processing algorithms. The processing algorithms are divided between the two processors, DSP1 and DSP2. DSP1 is the modem A processor 15 of FIG. 1 and DSP2 is the modem B processor.

The hardware provides effective communication between the two processors and the I/O 16. This is accomplished using the TMS-320C25 serial ports, supplemented with extra control circuitry. The serials ports of DSP1 and DSP2 are used in a time multiplexed fashion.

FIG. 11 is a block diagram of the LDR functions in the transmit mode in the voice subsystem 1. The low rate coding algorithms are implemented in a postprocessing to the standard LPC analysis. The unquantized reflection coefficients, pitch, gain and voicing parameters from LPC are compressed and formatted into a 400 bits per second data signal.

Decode and VQXMT form an interface function which obtains the pitch and gain parameters produced by the LPC analysis and formats them for input to the low rate processing. The trellis coder performs a look ahead search to find the optimal bit sequence to encode the pitch and gain information. EXXMT is a two-word array containing the trellis coder output symbols, delayed relative to the input. The buffering and bit mapping function delays the 400 bits per second parameters as required to maintain synchronization, formats them into a bit stream and writes the stream into an output buffer.

Figure 12:
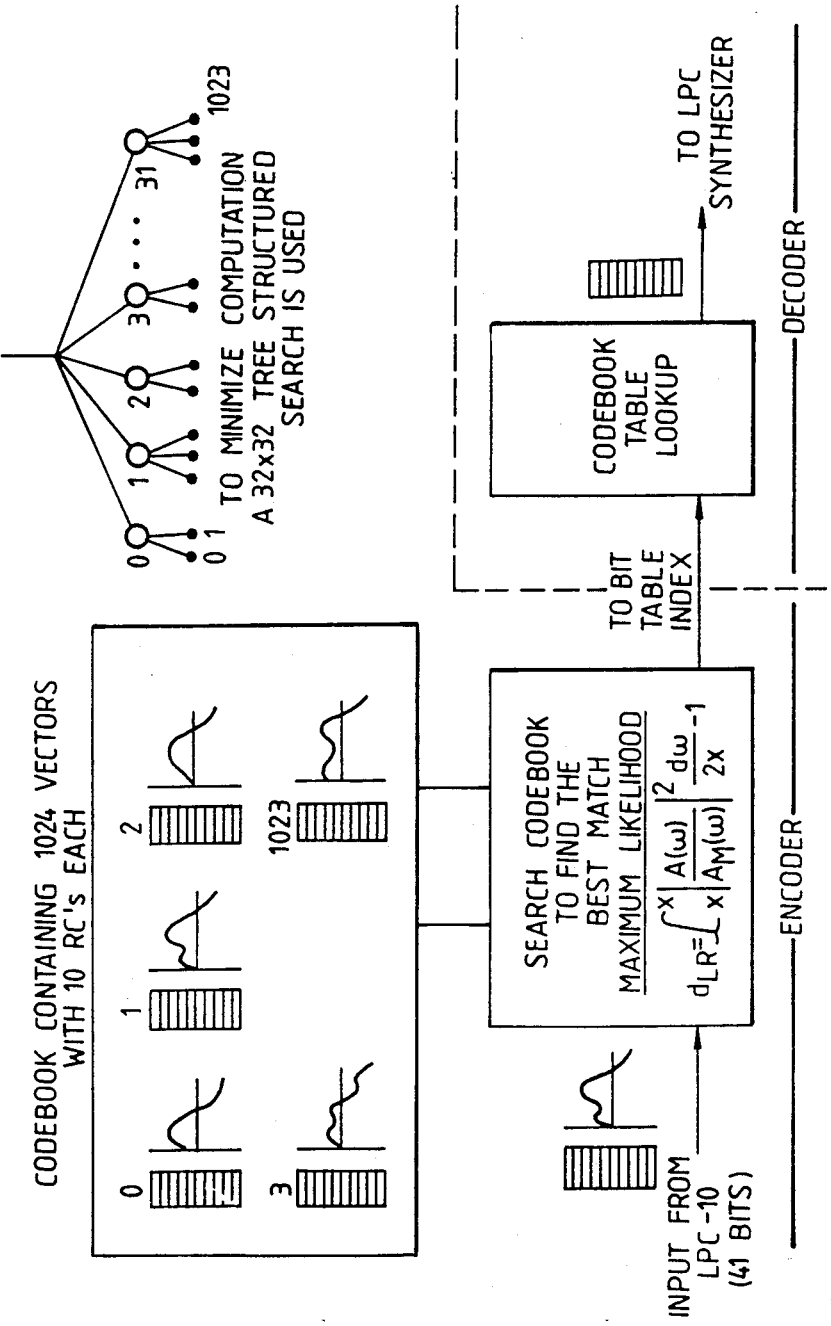
FIG. 12 illustrates the vector quantizer function within the LDR function in the voice processor.

FIG. 12 illustrates the vector quantizing function applied to the reflection coefficients. The input to the RC2R function is the set of 10 reflection coefficients computed using a step-up procedure which is a modification of the Levinson recursion. The coefficients are sent to the vector quantizer which implements a tree search with a split voiced/unvoiced codebook. For voiced frames, a comparison is made against 31 reference vectors, then a second level search is made against a block of 31 vectors. For unvoiced frames, a single search of 32 reference vectors is used.

The frame repeat function then determines the state of the frame repeat bit for each repeated frame which is passed to the buffering and bit mapping function. A one frame delay is produced.

FIG. 13 is a block diagram of the LDR receive voice algorithm. The bit unmapping and frame repeat functions accept as input a block of 18 bits and decodes them into parameters for two LPC frames. The first of these two frames is always a repeat frame. A modulo 2 count is maintained. If the count is zero, a block of 18 bits is read, the LPC parameters for the repeat frame are generated and the nonrepeat values are stored until the next frame. If the count is one, the stored non-repeat values are used to generate the LPC parameters. The vector table lookup converts vector quantization values back to the LPC compatible reflection coefficients while the trellis decoder performs the same function for pitch and gain parameters. Reflection coefficients, pitch and gain parameters are then properly formatted for input to the LPC synthesis function.

What is claimed is:

1. In a high frequency communication system employing a high frequency terminal which terminal can transmit a processed signal in a transmitting mode or process a received signal in a receiving mode, which terminal includes a first subsystem for voice processing including a processor responsive to voice signals to provide a linear predictative coded voice signal at a given data rate, which signal is coupled to a data modem subsystem to digitally encrypt said voice signal which data modem subsystem is coupled to a modem processor subsystem for processing said encrypted signal for providing frequency hopping, feedback equalization, intersymbol interference cancellation, error correction and interleaving to provide a transmitted signal which is relatively immune to jamming during said transmitting mode, the improvement therewith of apparatus for providing an improved transmitting operation comprising:

a convolutional encoder means included in said modem processor subsystem and responsive to said encrypted signal to provide a convoluted signal at a higher data rate than said encrypted signal at an output an interleave buffer having an input coupled to said encoder output for interleaving said higher data rate signal according to an interleaving algorithm;

a symbol encoder having one input responsive to said interleaved signal and one input coupled to a source of PN training signals as stored to provide at an output an encoded signal encoded according to said PN signal which PN training signal differs for each transmitting frequency;

a transmitting filter means responsive to said encoded signal and operative to limit the bandwidth of said signal; and a digital to analog converter means coupled to said transmitting filter means and operative to convert said limited bandwidth signal to an analog signal.

2. The apparatus according to claim 1 wherein said transmitting filter means includes a multiplier for multiplying said filtered signal by an exponential function and buffer means for storing said multiplied signal prior to application of said signal to said digital to analog converter means.

3. The apparatus according to claim 1 further including improved equalization means located in said modem processor subsystem and operative to improve equalization during said receiving mode, comprising in combination;

channel estimate means responsive to said PN training signal blocks to provide at an output an estimate of the received channel response; said estimate implemented by a least squares algorithm means in response to said known block of training symbols to provide said estimate for a given received data block;

precancellation means responsive to said estimate for separating data into predetermined blocks of data;

matched filter means coupled to said precanceller means and responsive to said blocks for sampling said blocks of data at a given rate;

convolution means coupled to said matched filter means and having an output coupled to means for performing a long division to provide at said long division output means equalization to said data blocks according to $$G(z) = \frac{C(z)}{M(z)}$$

where

G(z) is a feed forward equalizer transfer function and is a finite polynomial with K non zero coefficients;

C(z) is a finite polynomial with non zero coefficients;

M(z) is a finite polynomial and is the Z transform of the autocorrelation function of said estimated channel response.

4. The apparatus according to claim 3 wherein said estimated channel response is limited to M symbols and wherein M(z) has 2M−1 non-zero coefficients in the range of $z^{(M-1)}$ to $z^{(M-1)}$.

5. The apparatus according to claim 4 wherein C(z) has 2m−1 non zero coefficients in the range $z^{-(M-1)}$ to $z^{(M+K-2)}$ where K is a constant.

6. The apparatus according to claim 3 wherein said correlation means includes canceller means for providing a recursion canceller polynomial according to:

$$D_m(z) = D_{m-1}(z) - k_m z^{-m} D_{m-1}(1/z)$$

$$C_m(z) = C_{m-1}(z) + h_m z^m D_m(z)$$

where $D_m(z)$ is an auxiliary polynomial. Initially, $D_0(z)=M(z)$, $C_0(z)=h_0 M(z)$ and $h_o=1/M_0$. Then the recursion is repeated for m=1, ..., K-1 finally giving $C(z)=C_{K-1}(z)$.

7. The apparatus according to claim 6 wherein the following equations are also employed with said recursion:

$$k_m = \frac{d_m^{(m-1)}}{d_0^{(m-1)}},$$

and $$h_m = \frac{-c_{-m}^{(m-1)}}{d_0^{(m)}},$$

8. The apparatus according to claim 3 wherein said least squares algorithm means estimates said channel impulse response based on observations of said channel output in response to a known training data sequence according to $$y'_{n'} = \sum_{j=0}^{3M-1} h'_j a_{n-j} + \text{noise and/or distortion}, n' =$$

$$3M, \ldots, 3N + 3M - 1.$$

$h'_j$, = unknown channel response

M = maximum number of symbols duration of the channel impulse response

N+M = number of training signals in a training block

9. The apparatus according to claim 8 including three sets of channel impulse responses for providing said response according to $h^{(0)}=(h'_0,h'_3,h'_6,\ldots)$
$h^{(1)}=(h'_1,h'_4,h'_7,\ldots)$
$h^{(2)}=(h'_2,h'_5,h!_8,\ldots)$ 10. The apparatus according to claim 1 further including a low data rate transmitting means located in said modem processor subsystem and operative to provide an input data rate of 400 bits per second, encoding means including DFT means responsive to said input data to encode said data in the form of 6 bit groups and means for transmitting said 6 bit group at a different frequency rate.

11. The apparatus according to claim 10 including means operative in said transmitting mode to transmit a sequence of eight known PN training signals prior to transmitting data.

12. The apparatus according to claim 11 including means responsive in the receiving mode for receiving said PN symbols to provide therefrom a Doppler frequency estimate indicative of the quality of the transmission path.

13. The apparatus according to claim 12 including a low data rate receiving means located in said modem processor subsystem and including DFT means for measuring the amplitudes of received tones in a plurality of time slots, Doppler connection means coupled to said DFT means to position said received tones in said slots according to the Doppler characteristics of said communications channel, storage means for storing said received tones, means coupled to said storage means to determine data boundaries for said received tones, and decoder means coupled to said means for providing a decoded output signal.

14. The apparatus according to claim 12 wherein said DFT means is operative to generate 24 tone slots each spaced by 150 Hz.

15. The apparatus according to claim 12 further including tone map function means included in said DFT means for selecting 2 slots out of 12 slots which are used for a transmitted signal.

16. The apparatus according to claim 13 wherein said DFT means in said receiving means operates to measure amplitude of received tones in 12 tone slots.

17. The apparatus according to claim 16 including symbol detection means responsive to said 12 tone slots to measure the energy of said slots and to select 2 slots having the largest received energy.

18. The apparatus according to claim 13 including means for accumulating the squares of received sample energy within first and second time slots to provide an output timing error estimate indicative of the differences between received energy and means for storing said estimate wherein if said stored estimate is greater than a given number said first and second time slots are changed accordingly.

19. The apparatus according to claim 1 where said modem processor subsystem includes first and second processor modules with said first processor module coupled to said data modem subsystem and said second processor coupled to said first processor to exchange data and control information therewith.

20. The apparatus according to claim 3 wherein said modem processor subsystem includes analog to digital conversion means operative in said receiving mode to convert received analog data to digital data at an output.

21. The apparatus according to claim 20 wherein said analog to digital converter is sampled at a rate at least 3 times greater than said received data rate.

* * * * *